US012167202B2

(12) United States Patent
Elghannai et al.

(10) Patent No.: US 12,167,202 B2
(45) **Date of Patent: *Dec. 10, 2024**

(54) EAR-WORN ELECTRONIC DEVICE INCORPORATING ANTENNA WITH REACTIVELY LOADED NETWORK CIRCUIT

(71) Applicant: Starkey Laboratories, Inc., Eden Prairie, MN (US)

(72) Inventors: Ezdeen Elghannai, Eden Prairie, MN (US); Nikhil Nilakantan, Eden Prairie, MN (US); Aaron Anderson, Mayer, MN (US); Gregory John Haubrich, Champlin, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/311,887

(22) Filed: May 3, 2023

(65) Prior Publication Data

US 2023/0276183 A1 Aug. 31, 2023

Related U.S. Application Data

(63) Continuation of application No. 17/231,722, filed on Apr. 15, 2021, now Pat. No. 11,678,129, which is a (Continued)

(51) Int. Cl.
*H04R 25/00* (2006.01)
*H04R 1/10* (2006.01)

(52) U.S. Cl.
CPC ......... *H04R 25/554* (2013.01); *H04R 1/1058* (2013.01); *H04R 25/60* (2013.01);
(Continued)

(58) Field of Classification Search
CPC .............. H04R 25/554; H04R 2225/51; H04R 2225/025; H04R 25/608; H04R 1/1041;
(Continued)

(56) References Cited

U.S. PATENT DOCUMENTS 5,394,159 A 2/1995 Schneider
6,429,819 B1 8/2002 Bishop et al.
(Continued)

FOREIGN PATENT DOCUMENTS

EP 2680613 A2 1/2014

OTHER PUBLICATIONS

Berge et al., "Tuning a Dual-Band Bowtie Slot Antenna with Parabolic Radiating Slots for the 900 MHz and 2400 MHz Bands", 6th European Conference on Antennas and Propagation, Mar. 2012, pp. 2376-2379.

(Continued)

*Primary Examiner* — Carolyn R Edwards
*Assistant Examiner* — Julie X Dang
(74) *Attorney, Agent, or Firm* — Shumaker & Sieffert, P.A.

(57) ABSTRACT

Various embodiments are directed to an ear-worn electronic device configured to be worn by a wearer. The device comprises an enclosure configured to be supported by or in an ear of the wearer. Electronic circuitry is disposed in the enclosure and comprises a wireless transceiver. An antenna is situated in or on the enclosure and coupled to the wireless transceiver. The antenna comprises a first antenna element, a second antenna element, and a strap comprising a reactive component connected to the first and second antenna elements.

6 Claims, 9 Drawing Sheets

Related U.S. Application Data continuation of application No. 16/852,151, filed on Apr. 17, 2020, now Pat. No. 11,012,795, which is a continuation of application No. 15/718,760, filed on Sep. 28, 2017, now Pat. No. 10,631,109.

(52) U.S. Cl.
CPC ......... *H04R 25/609* (2019.05); *H04R 25/505* (2013.01); *H04R 2225/021* (2013.01); *H04R 2225/51* (2013.01)

(58) Field of Classification Search
CPC .. H04R 2420/07; H04R 25/552; H04R 25/70; H04R 25/505; H04R 2225/021; H04R 25/609; H04R 25/60; H04R 1/1058; H02I 37/025; H02J 5/005; H02J 17/00; H02J 50/90; H02J 50/40; H02J 50/60; H02J 50/80; H02J 50/20
See application file for complete search history.

(56) References Cited

U.S. PATENT DOCUMENTS

| | | | |
|---|---|---|---|
| 6,762,729 B2 | 7/2004 | Egashira | |
| 6,762,730 B2 | 7/2004 | Schadler | |
| 6,768,468 B2 | 7/2004 | Crouch et al. | |
| 7,016,738 B1 | 3/2006 | Karunasiri | |
| 7,148,850 B2 | 12/2006 | Puente Baliarda et al. | |
| 7,202,822 B2 | 4/2007 | Baliarda et al. | |
| 7,342,545 B2 | 3/2008 | Huynh et al. | |
| 7,751,902 B1 | 7/2010 | Karunasiri | |
| 8,259,026 B2 | 9/2012 | Pulimi et al. | |
| 8,405,561 B2 | 3/2013 | Handy et al. | |
| 8,406,831 B2 | 3/2013 | Yang et al. | |
| 8,565,457 B2 | 10/2013 | Polinske et al. | |
| 8,724,835 B2 | 5/2014 | Kerselaers et al. | |
| 9,300,367 B2 | 3/2016 | Christensen et al. | |
| 9,374,650 B2 | 6/2016 | Bauman | |
| 9,432,779 B2 | 8/2016 | Kerselaers | |
| 9,484,631 B1 | 11/2016 | Napoles et al. | |
| 9,635,475 B2 | 4/2017 | Polinske et al. | |
| 9,641,944 B2 | 5/2017 | Johnson et al. | |
| 9,706,318 B2 | 7/2017 | So et al. | |
| 9,906,879 B2 | 2/2018 | Prchal et al. | |
| 9,980,065 B2 | 5/2018 | Higgins et al. | |
| 10,070,232 B2 | 9/2018 | So et al. | |
| 10,297,910 B2 | 5/2019 | Hosadurga et al. | |
| 10,631,109 B2 | 4/2020 | Elghannai et al. | |
| 10,931,005 B2 | 2/2021 | Shriner et al. | |
| 10,951,997 B2 | 3/2021 | Shriner | |
| 10,979,828 B2 | 4/2021 | Elghannai et al. | |
| 11,012,795 B2 | 5/2021 | Elghannai et al. | |
| 11,678,129 B2 * | 6/2023 | Elghannai | H04R 25/609 381/315 |
| 2005/0099341 A1 | 5/2005 | Zhang et al. | |
| 2005/0117765 A1 | 6/2005 | Meyer et al. | |
| 2006/0093172 A1 | 5/2006 | Ludvigsen | |
| 2006/0220966 A1 | 10/2006 | Sarychev et al. | |
| 2006/0239483 A1 | 10/2006 | Orts et al. | |
| 2008/0267436 A1 | 10/2008 | Kerselaers | |
| 2008/0287084 A1 | 11/2008 | Krebs | |
| 2009/0219214 A1 | 9/2009 | Oh et al. | |
| 2010/0026775 A1 | 2/2010 | Parsi et al. | |
| 2013/0257676 A1 | 10/2013 | Kerselaers | |
| 2013/0343586 A1 | 12/2013 | Kvist et al. | |
| 2014/0091974 A1 | 4/2014 | Desclos et al. | |
| 2014/0376735 A1 | 12/2014 | Asrani | |
| 2015/0042524 A1 * | 2/2015 | Kerselaers | H01Q 1/273 343/718 |
| 2015/0049891 A1 | 2/2015 | Johnson | |
| 2015/0118973 A1 * | 4/2015 | Montgomery | H01Q 9/40 455/75 |
| 2016/0141757 A1 | 5/2016 | Lai et al. | |
| 2016/0295335 A1 | 10/2016 | Vajha et al. | |
| 2016/0330552 A1 | 11/2016 | Flood | |
| 2016/0366525 A1 | 12/2016 | Bodvarsson | |
| 2016/0381471 A1 | 12/2016 | Henriksen et al. | |
| 2018/0027343 A1 | 1/2018 | Dobson et al. | |
| 2018/0069322 A1 | 3/2018 | Vouvakis et al. | |
| 2018/0084351 A1 | 3/2018 | Polinske et al. | |
| 2018/0124528 A1 | 5/2018 | Polinkse et al. | |
| 2019/0116431 A1 | 4/2019 | Hesselballe et al. | |
| 2019/0116435 A1 | 4/2019 | Hesselballe et al. | |
| 2021/0235206 A1 | 7/2021 | Elghannai et al. | |

OTHER PUBLICATIONS

Fractus Antennas User Manual Micro Reach Xtend (FR05-S1-N-0-110), Nov. 2017, 12 pp.
Garje et al., “Single-Fee Triangular Slotted Microstrip Bowtie Antenna for Quad-bands Applications”, IOSR Journal of Electronics and Communication Engineering, vol. 11, Issue 5, Ver. III, Sep.-Oct. 2016, pp. 22-27.
Mansoul et al., “Multiband reconfigurable Bowtie slot antenna using switchable slot extension for WiFi, WiMAX, and WLAN applications”, Microw Opt Technol Lett; 60, Feb. 2018 pp. 413-418.
Murata et al., “Broadband Characteristics Analysis of Semicircle-Type Bow-tie Antenna with Hole Slots”, Electrical Engineering in Japan, vol. 159, No. 4, 2007, pp. 47-53. (Applicant points out, in accordance with MPEP 609.04(a), that the year of publication, 2007, is sufficiently earlier than the effective U.S. filing date, so that the particular month of publication is not in issue.).
Murugaveni et al., “Design of Slotted Waveguide Antenna for Radar Applications at X-Band”, International Journal of Engineering Research & Technology, vol. 3, Issue 11, Nov. 2014, pp. 426-428.
Notice of Allowance of U.S. Appl. No. 16/852,151, mailed Jan. 22, 2021, 8 pp.
Prosecution History from U.S. Appl. No. 15/718,760, dated Jan. 31, 2019 through Dec. 18, 2019, 81 pp.
Prosecution History from U.S. Appl. No. 17/231,722, dated Sep. 1, 2022 through Feb. 7, 2023, 10 pp.

* cited by examiner

EAR-WORN ELECTRONIC DEVICE INCORPORATING ANTENNA WITH REACTIVELY LOADED NETWORK CIRCUIT

This application is a continuation of U.S. patent application Ser. No. 17/231,722, filed Apr. 15, 2021, which is a continuation of U.S. patent application Ser. No. 16/852,151, filed Apr. 17, 2020, issued as U.S. Pat. No. 11,012,795, which is a continuation of U.S. patent application Ser. No. 15/718,760, filed Sep. 28, 2017, issued as U.S. Pat. No. 10,631,109, the entire content of each of which is incorporated by reference.

TECHNICAL FIELD

This application relates generally to hearing devices, including ear-worn electronic devices, hearing aids, personal amplification devices, and other hearables.

BACKGROUND

Hearing devices provide sound for the wearer. Some examples of hearing devices are headsets, hearing aids, speakers, cochlear implants, bone conduction devices, and personal listening devices. Hearing devices may be capable of performing wireless communication with other devices. For example, hearing aids provide amplification to compensate for hearing loss by transmitting amplified sounds to their ear canals. The sounds may be detected from the wearer's environment using the microphone in a hearing aid and/or received from a streaming device via a wireless link. Wireless communication may also be performed for programming the hearing aid and receiving information from the hearing aid. For performing such wireless communication, hearing devices such as hearing aids may each include a wireless transceiver and an antenna.

SUMMARY

Various embodiments are directed to an ear-worn electronic device configured to be worn by a wearer. The device comprises an enclosure configured to be supported by or in an ear of the wearer. Electronic circuitry is disposed in the enclosure and comprises a wireless transceiver. An antenna is situated in or on the enclosure and coupled to the wireless transceiver. The antenna comprises a first antenna element, a second antenna element, and a reactive component coupled to the first and second antenna elements.

According to other embodiments, an ear-worn electronic device is configured to be worn by a wearer and comprises an enclosure configured to be supported by or in an ear of the wearer. Electronic circuitry is disposed in the enclosure and comprises a wireless transceiver. An antenna is situated in or on the enclosure and comprises a first antenna element having a first side and an opposing second side. The first side of the first antenna element is connected to a first feed line conductor. The antenna comprises a second antenna element having a first side and an opposing second side. The first side of the second antenna element is connected to a second feed line conductor. The first and second feed line conductors are coupled to the wireless transceiver. A strap is connected to the second side of the first antenna element and the second side of the second antenna element. The strap comprises a reactive component.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
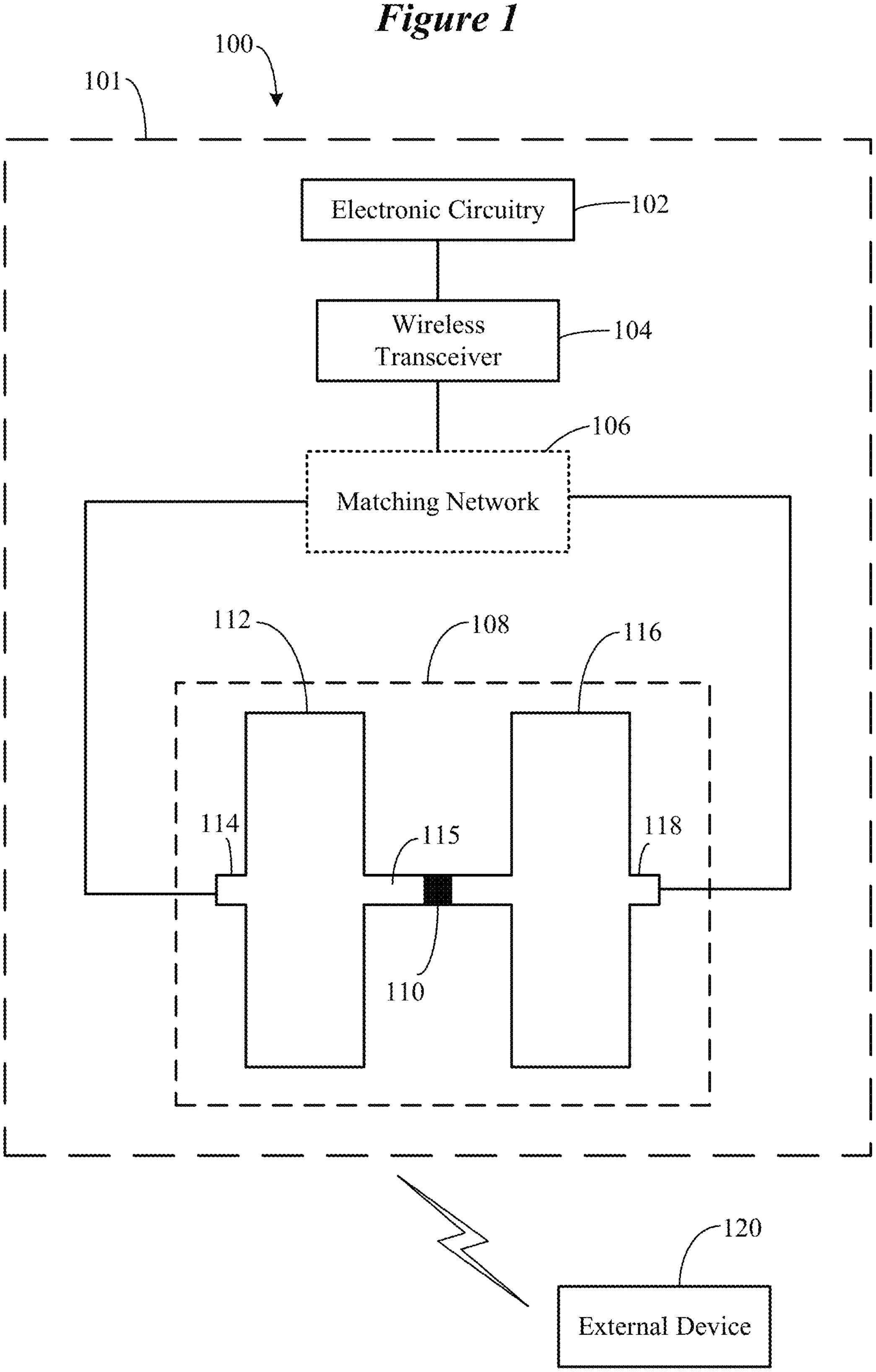
FIG. 1 illustrates an ear-worn electronic device configured to be worn by a wearer in accordance with various embodiments.

It is understood that the embodiments described herein may be used with any ear-worn electronic device without departing from the scope of this disclosure. The devices depicted in the figures are intended to demonstrate the subject matter, but not in a limited, exhaustive, or exclusive sense. Ear-worn electronic devices, such as hearables (e.g., wearable earphones, ear monitors, and earbuds), hearing aids, and hearing assistance devices, typically include an enclosure, such as a housing or shell, within which internal components are disposed. Typical components of an ear-worn electronic device can include a digital signal processor (DSP), memory, power management circuitry, one or more communication devices (e.g., a radio, a near-field magnetic induction (NFMI) device), one or more antennas, one or more microphones, and a receiver/speaker, for example. Ear-worn electronic devices can incorporate a long-range communication device, such as a Bluetooth® transceiver or other type of radio frequency (RF) transceiver. A communication device (e.g., a radio or NFMI device) of an ear-worn electronic device can be configured to facilitate communication between a left ear device and a right ear device of the ear-worn electronic device.

Ear-worn electronic devices of the present disclosure can incorporate an antenna arrangement coupled to a high-frequency radio, such as a 2.4 GHz radio. The radio can conform to an IEEE 802.11 (e.g., WiFi®) or Bluetooth® (e.g., BLE, Bluetooth® 4.2 or 5.0) specification, for example. It is understood that hearing devices of the present disclosure can employ other radios, such as a 900 MHz radio. Ear-worn electronic devices of the present disclosure can be configured to receive streaming audio (e.g., digital audio data or files) from an electronic or digital source. Representative electronic/digital sources (e.g., accessory devices) include an assistive listening system, a TV streamer, a radio, a smartphone, a laptop, a cell phone/entertainment device (CPED) or other electronic device that serves as a source of digital audio data or other types of data files. Ear-worn electronic devices of the present disclosure can be configured to effect bi-directional communication (e.g., wireless communication) of data with an external source, such as a remote server via the Internet or other communication infrastructure.

The term ear-worn electronic device of the present disclosure refers to a wide variety of ear-level electronic devices that can aid a person with impaired hearing. The term ear-worn electronic device also refers to a wide variety of devices that can produce optimized or processed sound for persons with normal hearing. Ear-worn electronic devices of the present disclosure include hearables (e.g., wearable earphones, headphones, earbuds, virtual reality headsets), hearing aids (e.g., hearing instruments), cochlear implants, and bone-conduction devices, for example. Ear-worn electronic devices include, but are not limited to, behind-the-ear (BTE), in-the-ear (ITE), in-the-canal (ITC), invisible-in-canal (IIC), receiver-in-canal (RIC), receiver-in-the-ear (RITE) or completely-in-the-canal (CIC) type hearing devices or some combination of the above. Throughout this disclosure, reference is made to an "ear-worn electronic device," which is understood to refer to a system comprising one of a left ear device and a right ear device or a combination of a left ear device and a right ear device.

FIG. 1 illustrates an ear-worn electronic device configured to be worn by a wearer in accordance with various embodiments. The ear-worn electronic device 100 includes an enclosure 101, such as a shell, configured to be supported by or in an ear of the wearer. The ear-worn electronic device 100 includes electronic circuitry 102 disposed in the enclosure 101 and comprises a wireless transceiver 104. An antenna 108 is situated in or on the enclosure 101 and coupled to the wireless transceiver 104. In some embodiments, a matching network 106 is coupled between the antenna 102 and the wireless transceiver 104. As shown, the matching network 106 is coupled to feed line conductors 114 and 118 of the antenna 108. In other embodiments, the matching network 106 is not needed (e.g., no matching network is attached to the antenna feed line conductors).

In general terms, a matching network is a type of electronic circuit that is designed to be mounted between a radio (e.g., radio chip) and the antenna feed. In principle, these electronic circuits should match the radio output impedance to the antenna input impedance (or match the radio input impedance to the antenna output impedance when in a receive mode) for maximum power transfer. In accordance with embodiments of the disclosure, a reactively loaded network circuit is placed on the antenna structure itself, rather than at the antenna feed point. Unlike a traditional matching network, a reactively loaded network circuit placed on the antenna structure enhances the antenna radiation properties in addition to reducing the impedance mismatch factor. This yields much better performance in terms of the antenna efficiency. In some embodiments, inclusion of a reactively loaded network circuit placed on the antenna structure provides for the elimination of a matching network between the radio and the antenna feed point. In other embodiments, inclusion of a reactively loaded network circuit placed on the antenna structure provides for a reduction in the complexity (e.g., a reduced number of components) needed for impedance matching between the radio and the antenna feed point.

In the embodiment shown in FIG. 1, the antenna 108 includes a first antenna element 112 and a second antenna element 116. It is noted that the antenna 108 shown in FIG. 1 is in a flattened state for illustrative purposes. Typically, the antenna 108 is a folded structure (e.g., see FIG. 3A), such that a gap is formed between the two roughly parallel first and second antenna elements 112 and 116. The first and second antenna elements 112 and 116 can be formed from conductive plates that can be shaped to fit within the enclosure 101. In some embodiments, the first and second antenna elements 112 and 116 comprise stamped metal plates. In other embodiments, the first and second antenna elements 112 and 116 comprise plastic plates that support a metallization layer(s) (e.g., by use of a Laser Direct Structuring (LDS) technique). In further embodiments, the first and second antenna elements 112 and 116 are implemented as flex circuits within the enclosure 101 (e.g., outer shell) of the ear-worn electronic device.

As is shown in FIG. 1, a reactive component 110 is coupled between the first and second antenna elements 112 and 116. More particularly, the first and second antenna elements 112 and 116 are connected together by a conductive strap 115. In some embodiments, the reactive component 110 is a passive electrical component (e.g., lumped or discrete component) mounted to the strap 115. In other embodiments, the reactive component 110 is a distributed electrical component comprising multiple passive electrical components. In further embodiments, a shaped portion of the strap 115 functions as a distributed reactive component 110. It is noted that the strap 115 can be a flattened planar member formed from a metal or a metalized flattened planar member formed from plastic. In some embodiments, the strap 115 can be a wire that connects the reactive component 110 to each of the first and second antenna elements 112 and 116.

In the embodiment illustrated in FIG. 1, two antenna elements 112 and 116 and a reactive component 110 are shown. It is understood that an ear-worn electronic device can incorporate three or more antenna elements with one or more impedance networks connecting the three or more antenna elements.

According to various embodiments, the antenna 108 is configured as a bowtie antenna. Bowtie antennas are generally known as dipole broadband antennas, and can be referred to as "butterfly" antennas or "biconical" antennas. In general, a bowtie antenna can include two roughly parallel conductive plates that can be fed at a gap between the two conductive plates. Examples of the bowtie antenna as used in hearing aids are disclosed in U.S. patent application Ser. No. 14/706,173, entitled "HEARING AID BOWTIE ANTENNA OPTIMIZED FOR EAR TO EAR COMMUNICATIONS", filed on May 7, 2015, and in U.S. patent applicant Ser. No. 15/331,077, entitled "HEARING DEVICE WITH BOWTIE ANTENNA OPTIMIZED FOR SPECIFIC BAND, filed on Oct. 21, 2016, which are commonly assigned to Starkey Laboratories, Inc., and incorporated herein by reference in their entirety. It is understood that antennas other than bowtie antennas can be implemented to include an on-antenna reactively loaded network circuit in accordance with embodiments of the disclosure. Such antennas include any antenna structure that includes two or more somewhat independent portions that may be loaded with elements connecting at least two or more of these portions. Representative antennas include dipoles, monopoles, dipoles with capacitive-hats, monopoles with capacitive-hats, folded dipoles or monopoles, meandered dipoles or monopoles, loop antennas, yagi-uda antennas, log-periodic antennas, slot antennas, inverted-F antennas (IFA), planer inverted-F antennas (PIFA), rectangular microstrip (patch) antennas, and spiral antennas.

Designing antennas with high efficiency for ear-worn electronic devices, such as hearing aids for example, is a very challenging task. When used in an electronic device that is to be worn on or in a wearer's head, the impedance of the antenna can be substantially affected by the presence of human tissue, which degrades the antenna performance. Such effect is known as head loading and can make the performance of the antenna when the electronic device is worn (referred to as "on head performance") substantially different from the performance of the antenna when the electronic device is not worn. Impedance of the antenna including effects of head loading depends on the configuration and placement of the antenna, which are constrained by size and placement of other components of the ear-worn electronic device.

Performance of an antenna in wireless communication, such as its radiation efficiency, depends on impedance matching between the feed point of the antenna and the output of the communication circuit such as a transceiver. The impendence of the antenna is a function of the operating frequency of the wireless communication. The small physical size of the antenna of an ear-worn electronic device with respect to its operating frequency imposes significant physical constraints and limits the total radiated power (TRP) of the antenna. Embodiments of the disclosure provide from a significant increase antenna TRP and improved impedance matching by incorporating a reactively loaded network circuit on the antenna itself.

In various embodiments, the antenna shown in FIG. 1 and in other figures can allow for ear-to-ear communication with another ear-worn electronic device 100 worn by the same wearer. The antenna shown in FIG. 1 can also provide for communication with another device 120 capable of wireless communication with the ear-worn electronic device 100. The external device 120 can represent many different types of devices and systems, such as a programming device, a smartphone, a laptop, an audio streaming device, a device configured to send one or more types of notification to the wearer, and a device configured to allow the wearer to use the hearing device as a remote controller.

Figure 2A:
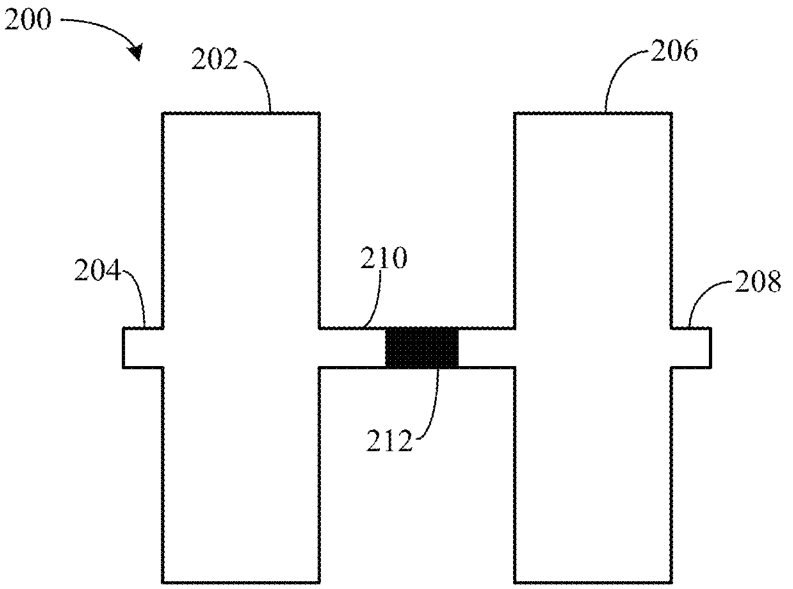
FIG. 2A shows a reactively loaded network circuit implemented on an antenna structure of an ear-worn electronic device in accordance with various embodiments.

FIG. 2A shows a reactively loaded network circuit implemented on an antenna structure of an ear-worn electronic device in accordance with various embodiments. As in the case of the embodiment shown in FIG. 1, the antenna 200 shown in FIG. 2A is illustrated in a flattened state. FIG. 2A shows an antenna 200 which includes a first antenna element 202 connected to a second antenna element 206 by a strap 210. The first antenna element 202 includes a feed line conductor 204, and the second antenna element 206 includes a feed line conductor 208. A reactive component 212 is shown mounted to or structurally integrated into the strap 210. The reactive component 212 mounted to or incorporated within the strap 210 defines a reactively loaded network circuit, which may be referred to as a distributed matching network. The antenna 200 which includes the reactive component 212 can be referred to as a loaded-antenna.

Figure 2B:
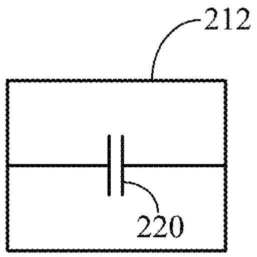
FIG. 2B shows the reactively loaded network circuit of FIG. 2A comprising a capacitor.
Figure 2D:
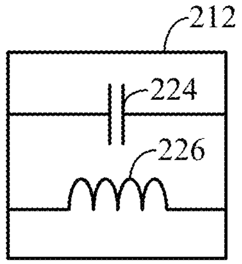
FIG. 2D shows the reactively loaded network circuit of FIG. 2A comprising a capacitor and an inductor.
Figure 2C:
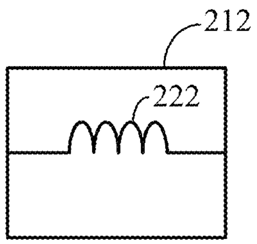
FIG. 2C shows the reactively loaded network circuit of FIG. 2A comprising an inductor.
Figure 2E:
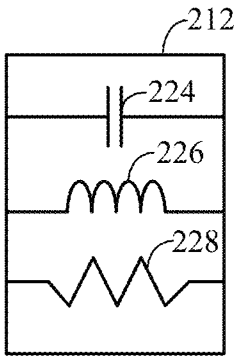
FIG. 2E shows the reactively loaded network circuit of FIG. 2A comprising a combination of a capacitor, an inductor, and a resistor.

According to some embodiments, and as shown in FIG. 2B, the reactive component 212 comprises a capacitor 220. In other embodiments, as shown in FIG. 2C, the reactive component 212 comprises an inductor 222. In further embodiments, as shown in FIG. 2D, the reactive component 212 comprises a capacitor 224 and an inductor 226, coupled in parallel or series (e.g., arranged to form a parallel or series L-C network). In other embodiments, as shown in FIG. 2E, the reactive component 212 comprises a capacitor 224, an inductor 226, and a resistor 228. The components shown in FIG. 2E can be arranged to form a series RLC network or a parallel RLC network. In some embodiments, the reactive component 212 comprises a surface mount component or components.

It was found by the inventors that incorporating the reactive component 212 in the antenna structure itself significantly improve the radiation efficiency of the antenna 200. As will be discussed in detail hereinbelow, the total radiated power of the antenna 200 can be increased significantly by adding the reactive component 212 to the antenna structure itself. This improvement in antenna performance results from a change in the current flow through the antenna 200.

The RF current flow in an antenna is a function of location and physics. Different voltage differences also exist between the two antenna portions at different physical locations. Introducing the correct impedance across the two antenna elements at specific locations causes current to flow between the two connected antenna portions. The amount of current depends on the magnitude and phase of the connecting impedance relative to the antenna portions differential source impedance and voltage at the connection points. The amount and phase of current is chosen to optimize either antenna efficiency or antenna feed-point impedance, or both.

The reactive component 212 or load modifies the antenna's surface current to allow for more current distribution over the whole structure of the antenna 200 which enhances the antenna radiation properties. Additionally, this surface current distribution modifies the current at the feed point resulting in an increase in the input impedance, real part, and thus increasing the antenna efficiency as a result. Without this reactive component 212 or load, the antenna surface current could be limited to a few parts of the structure not allowing the desire surface current to distribute over the whole antenna structure. As a result, the input impedance of an unloaded antenna tends to be smaller than the loaded antenna.

Figure 3A:
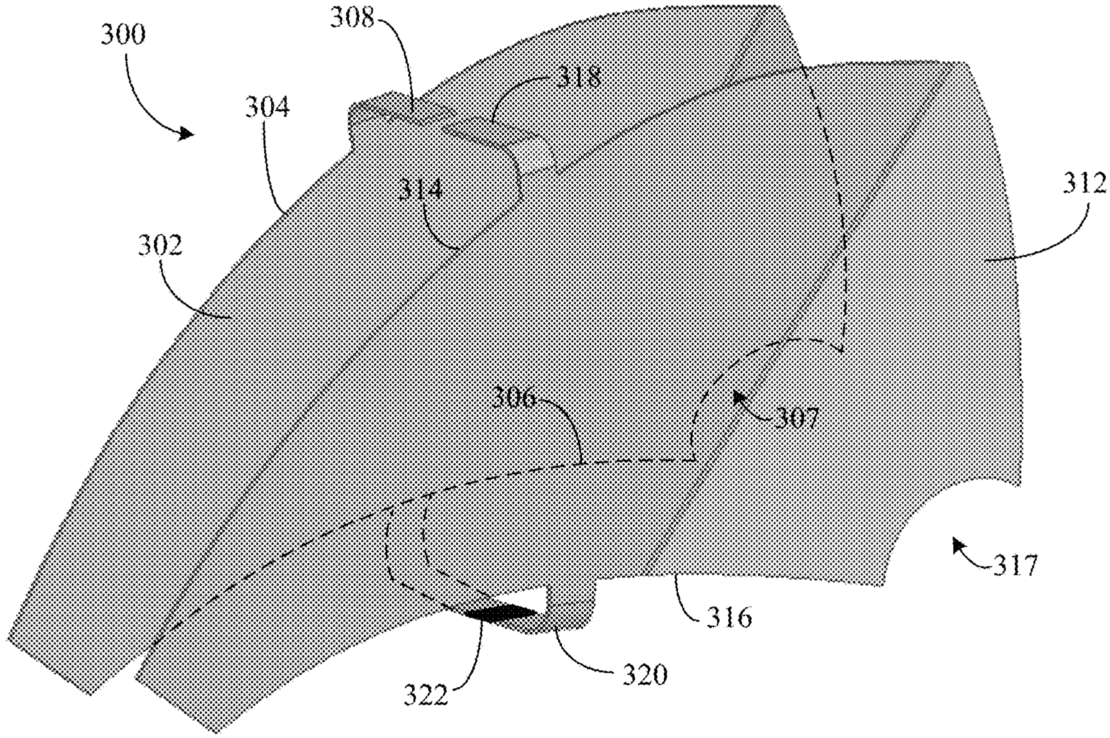
FIGS. 3A and 3B show a bowtie antenna which incorporates a reactively loaded network circuit in accordance with various embodiments.
Figure 3B:
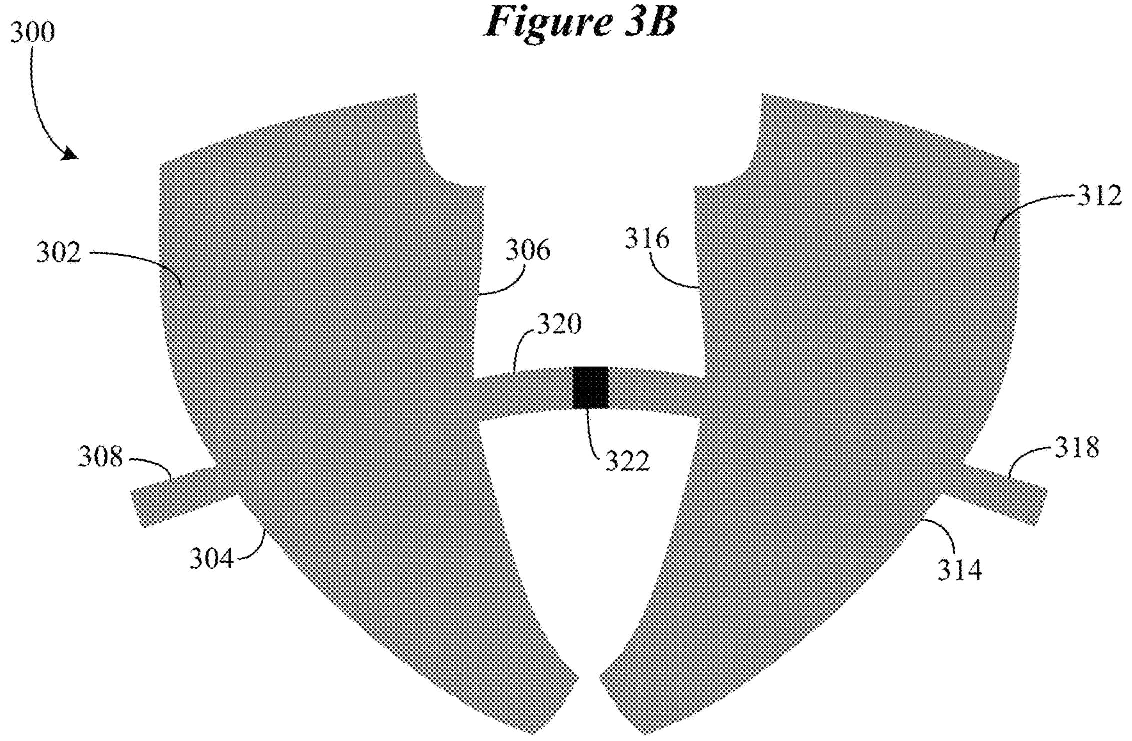

FIGS. 3A and 3B show a bowtie antenna 300 which incorporates a reactively loaded network circuit in accordance with various embodiments. In FIG. 3A, the antenna 300 is shown in an orientation as installed in an ear-worn electronic device. FIG. 3B shows the antenna 300 in a flattened state. The antenna 300 includes a first antenna element 302 having a first side 304 and an opposing second side 306. The first side 304 of the first antenna element 302 is connected to a first feed line conductor 308. The antenna 300 includes a second antenna element 312 having a first side 314 and an opposing second side 316. The first side 314 of the second antenna element 312 is connected to a second feed line conductor 318.

When installed in an ear-worn electronic device, the first and second antenna elements 302 and 312 are roughly parallel to one another. It is noted that the second sides 306 and 316 of the first and second antenna elements 302 and 312 include a notched region 307 and 317 to accommodate one or more components or structures of the ear-worn electronic device. In an installed configuration, the first and second feed line conductors 308 and 318 are coupled to a wireless transceiver, either directly or via a matching network.

A strap 320 connects the second side 306 of the first antenna element 302 to the second side 316 of the second antenna element 312. The strap 320 supports or incorporates a reactive component 322, which may be a capacitor, an inductor, or the combination of a capacitor and inductor.

Various experiments were performed on a bowtie antenna of the type shown in FIGS. 3A and 3B to evaluate the performance of the antenna before and after incorporating a reactively loaded network circuit on the antenna itself. Three different configurations of the antenna 300 were used in the experiments. Impedance measurements were made for each of the left and right antenna elements 302 and 312. The total radiated power was measured with the antennas 300 placed in a Tesla chamber. It is noted that the TRP measurements were obtained using an industry-standard dummy head/torso.

Antenna input impedance measurements (ohms) for the three difference antenna configurations were obtained using a 2.45 GHz signal generated by the radio chip. The real (R) and imaginary (X) parts of the antenna input impedance were measured and recorded for each of the left and right antenna elements 302 and 312. The total radiated power (in dBm) for each of the left and right antenna elements 302 and 312 was measured and recorded at each of five different frequencies (2404 MHz, 2420 MHz, 2440 MHz, 2460 MHz, and 2478 MHz).

In a first configuration that was evaluated, the antenna 300 included a strap 320 but did not include a reactive component 322. A matching network was not used between the feed line conductors 308 and 318 of the antenna 300 and the radio chip. The impedance measurements for this first antenna configuration are given below in Table 1.

TABLE 1

| Impedance Measurements (ohm) @ 2.45 GHz | | | | |
|---|---|---|---|---|
| | Left | | Right | |
| | R | X | R | X |
| Average | 18.49 | 82.65333 | 21.25667 | 79.05667 |

The TRP measurements for this first antenna configuration are given below in Table 2. Table 2 includes the TRP measurements before and after use of a matching network (MN).

TABLE 2

| Frequency (MHz) | 2404 | 2420 | 2440 | 2460 | 2478 |
|---|---|---|---|---|---|
| Before MN-left | −15.05903 | −15.4599 | −14.2215 | −11.4591 | −15.2309 |
| MN-Left | −9.869833 | −9.20686 | −10.2371 | −11.5317 | −10.4831 |
| Before MN-right | −14.4433 | −14.6335 | −13.5734 | −10.5109 | −14.0559 |
| MN-Right | −9.31139 | −8.7079 | −10.1229 | −12.5494 | −9.97507 |

In a second configuration that was evaluated, the antenna 300 included a reactive component 322 on the strap 320 and a matching network between the radio chip and the antenna 300. The input impedance measurements for this second antenna configuration are given below in Table 3.

TABLE 3

| Impedance Measurements (ohm) @ 2.45 GHz | | | | |
|---|---|---|---|---|
| | Left | | Right | |
| | Driving | X | R | X |
| Average | 28.946667 | 149.8767 | 30.92 | 145.1433 |

When comparing the input impedance measurements in Table 3 to those in Table 1, it can be seen that a significant increase (a factor of ~1.56) in the real part of the input impedance is realized by inclusion of the reactive component 322 on the antenna structure. This increase in the antenna's input resistance corresponds to an increase in the efficiency of the antenna 300. This increase in the antenna's input resistance also results in a matching network design that is simpler (e.g., a reduced number of components) for those configurations that include a matching network.

In the second antenna configuration, the reactive component 322 was a capacitor having a value of 0.9 pF. The value of 0.9 pF was chosen such that it cancels the reactive part (the imaginary (X) part) of the input impedance as seen from the strap terminals. It is noted that the matching network for the second antenna configuration was designed after collecting the antenna input impedance values provided in Table 3.

TABLE 4

| Frequency (MHz) | 2404 | 2420 | 2440 | 2460 | 2478 |
|---|---|---|---|---|---|
| MN-Left | −7.34221 | −7.42736 | −8.83363 | −8.69139 | −8.77095 |
| MN-Right | −7.87996 | −7.74929 | −9.55305 | −10.6012 | −9.98339 |

The TRP measurements shown in Table 4 above, when compared to those of Table 2, demonstrate that an appreciable increase in TRP of antenna 300 (e.g., ~2.8 dBm @ 2460 MHz) can be realized by inclusion of a reactive component 322 on the antenna structure.

In a third configuration that was evaluated, the antenna 300 included a reactive component 322 on the strap 320 and a matching network between the radio chip and the antenna 300. To further improve the efficiency of the antenna 300, the reactive component 322 used to load the strap 320 was further optimized to enhance antenna performance, particularly the antenna input resistance. This optimization resulted in use of a capacitor having a value of 1.2 pF. The input impedance measurements for this third antenna configuration are given below in Table 5.

TABLE 5

| Impedance Measurements (ohm) @ 2.45 GHz | | | | |
|---|---|---|---|---|
| | Left | | Right | |
| | R | X | R | X |
| Average | 71 | 69 | 74 | 74 |

When comparing the input impedance measurements in Table 5 to those in Table 1, it can be seen that a significant increase in the antenna's input resistance is realized by inclusion of the optimized reactive component 322 (1.2 pF capacitor) on the antenna structure. More particularly, the input resistance of the left antenna element 302 was increased from 18.40 ohm to 71 ohm (a factor of ~3.8). The input resistance of the right antenna element 312 was increased from ~21.26 ohm to 74 ohm (a factor of ~3.5). As was discussed previously, this appreciable increase in the antenna's input resistance corresponds to an increase in the efficiency of the antenna 300 and a simplification of the matching network design (for those configurations that include a matching network).

TABLE 6

| Frequency (MHz) | 2404 | 2420 | 2440 | 2460 | 2478 |
|---|---|---|---|---|---|
| MN-Left (dBm) | −5.88 | −5.37 | −6.58 | −7.59 | −7.42 |
| MN-Right (dBm) | −5.97 | −5.71 | −6.86 | −7.13 | −6.91 |

The TRP measurements shown in Table 6 above when compared to those of Table 2 demonstrate that an appreciable increase in TRP of antenna 300 (e.g., ~5.4 dBm) can be realized by including a reactive component 322 on the antenna structure and optimizing the antenna input resistance.

Figure 4:
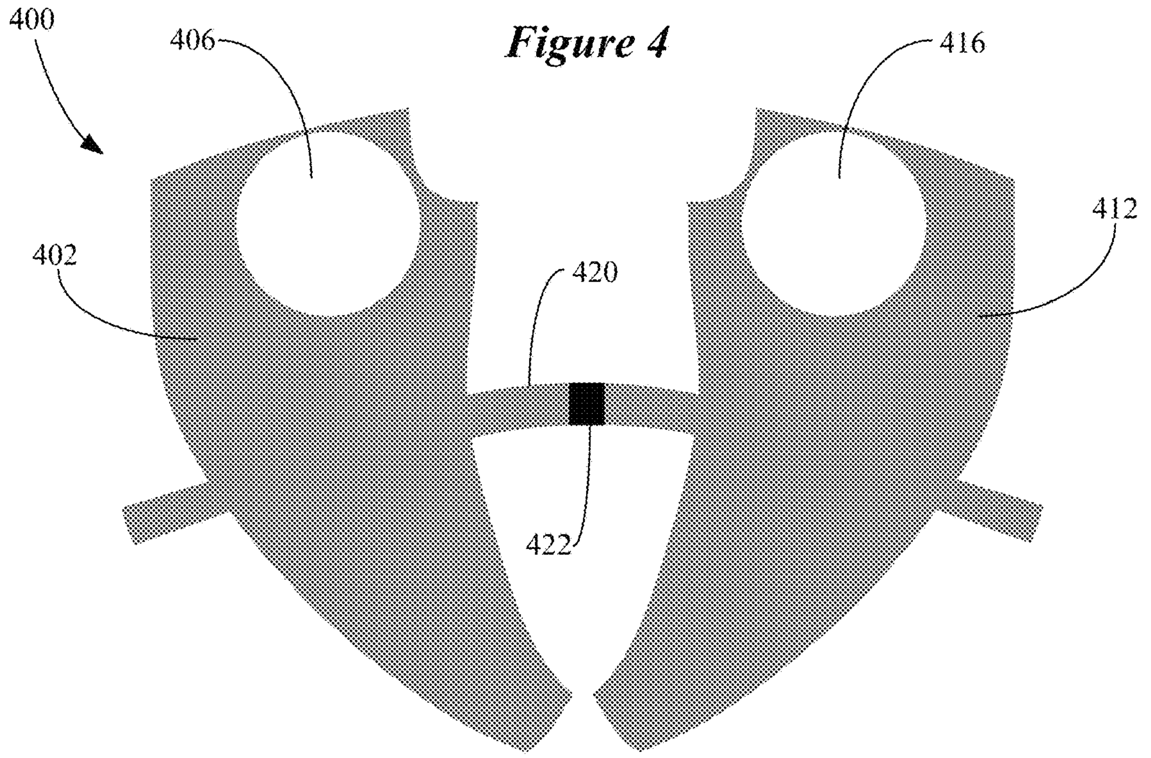
FIG. 4 illustrates an antenna comprising a reactively loaded network circuit in accordance with various embodiments.

FIG. 4 illustrates an antenna comprising a reactively loaded network circuit in accordance with various embodiments. The antenna 400 includes a first antenna element 402, a second antenna element 412, and a strap 420 connecting the first and second antenna elements 402 and 412. A reactive component 422 is mounted to or mechanically integrated into the strap 420. The reactive component 422 can comprise a capacitor, an inductor, or combination of a capacitor and an inductor. A wide region of the first and second antenna elements 402 and 412 includes a circular cutout 406 and 416. The cutouts 406 and 416 can be dimensioned to accommodate one or more components and/or structures of the ear-worn electronic device. For example, the circular cutouts 406 and 416 can be dimensioned to receive a battery of the ear-worn electronic device.

Figure 5:
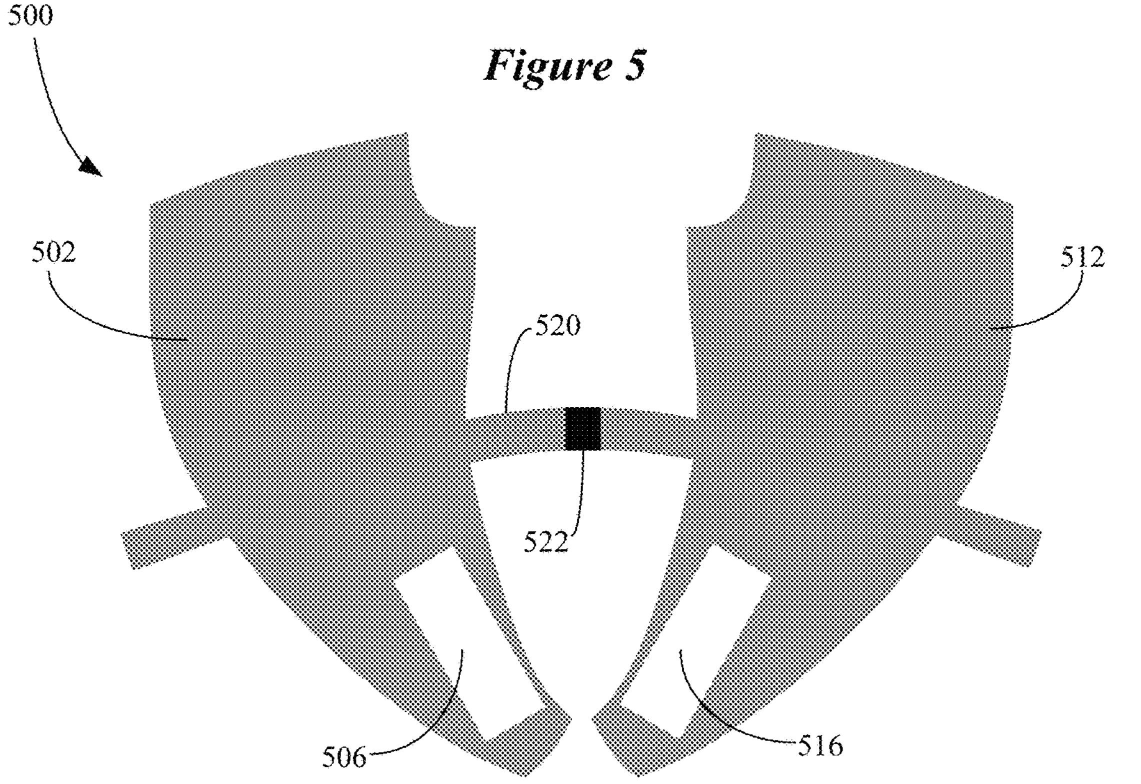
FIG. 5 illustrates an antenna comprising a reactively loaded network circuit in accordance with various embodiments.

FIG. 5 illustrates an antenna comprising a reactively loaded network circuit in accordance with other embodiments. The antenna 500 includes a first antenna element 502, a second antenna element 512, and a strap 520 connecting the first and second antenna elements 502 and 512. A reactive component 522 is mounted to or mechanically integrated into the strap 520. The reactive component 522 can comprise a capacitor, an inductor, or the combination of a capacitor and an inductor. A narrow region of the first and second antenna elements 502 and 512 includes a rectangular cutout 506 and 516. The cutouts 506 and 516 can be dimensioned to accommodate one or more components and/or structures of the ear-worn electronic device.

Figure 6A:
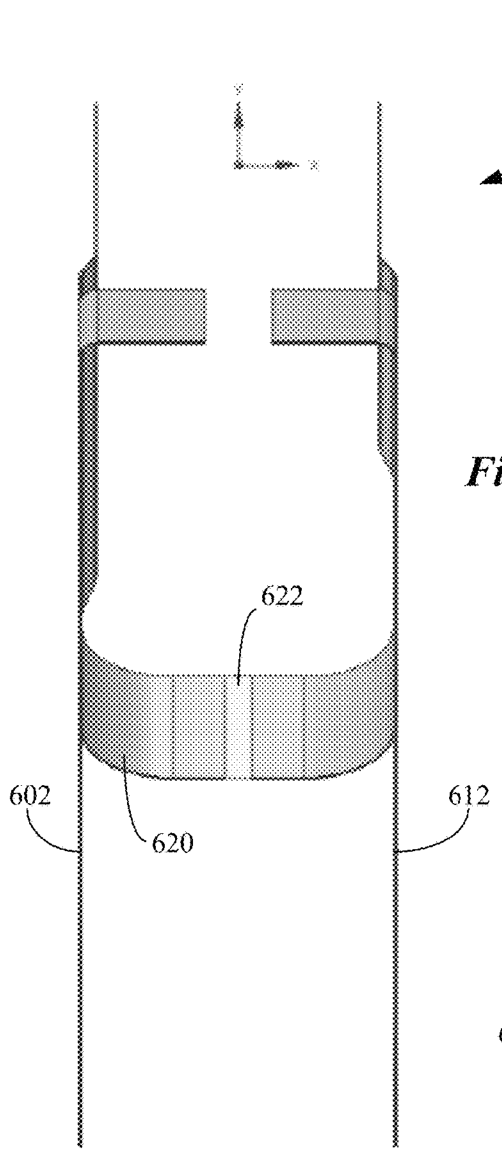
FIGS. 6A and 6B illustrate an antenna comprising a reactively loaded network circuit in accordance with various embodiments.
Figure 6B:
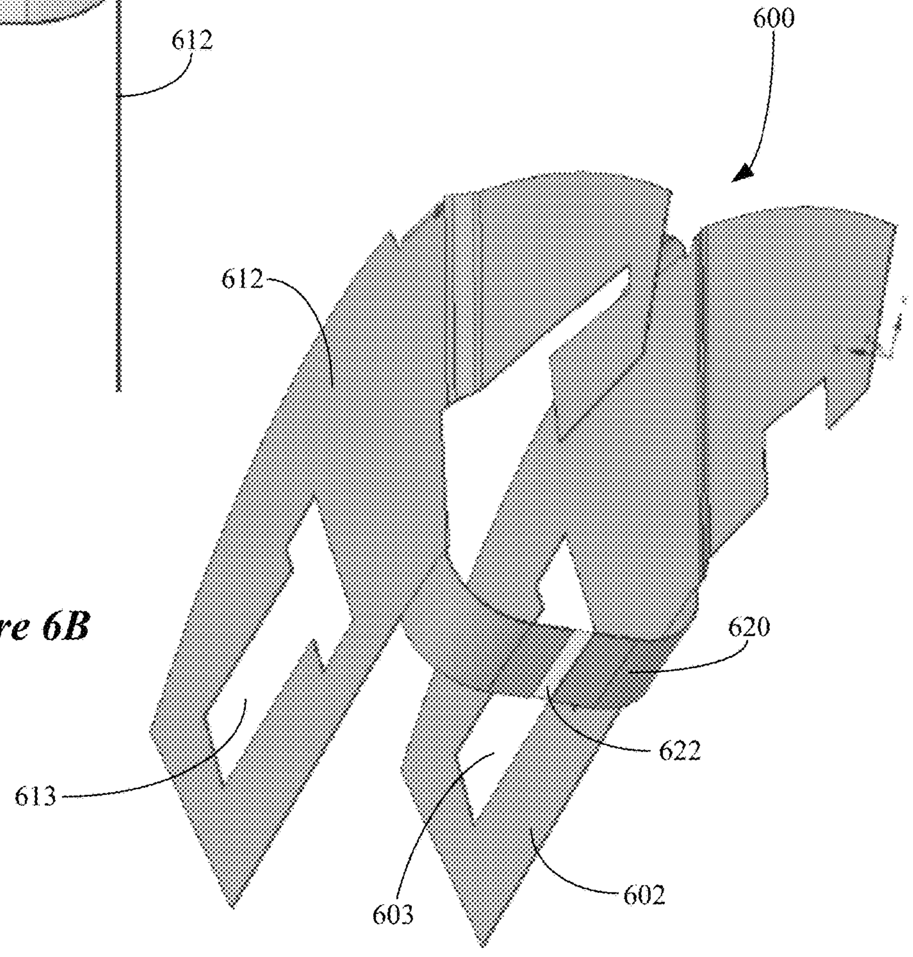

FIGS. 6A and 6B illustrate an antenna comprising a reactively loaded network circuit in accordance with other embodiments. The antenna 600 includes a first antenna element 602, a second antenna element 612, and a strap 620 connecting the first and second antenna elements 602 and 612. A reactive component 622 is mounted to the strap 620. The reactive component 622 can comprise a capacitor, an inductor, or the combination of a capacitor and an inductor. A narrow region of the first and second antenna elements 602 and 612 includes a T-shaped cutout 603 and 613. The cutouts 603 and 613 can be dimensioned to accommodate one or more components and/or structures of the ear-worn electronic device.

According to some embodiments, the antenna cutouts shown in FIGS. 4-6 (and other figures) can be shaped and positioned in the first and second antenna elements to help optimize performance of the antenna. For example, the antenna cutouts and/or notches can be configured (e.g., sized, shaped, and positioned in antenna elements) to help optimize performance of the antenna for one or more specified frequency bands. An example of the one or more specified frequency bands includes the 2.4 GHz Industrial Scientific Medical (ISM) radio band (e.g., with a frequency range of 2.4 GHz-2.5 GHz and a center frequency of 2.45 GHz). The introduction of one or more antenna cutouts and/or notches serves to modify the aperture of the antenna. The one or more antenna cutouts and/or notches can be configured to optimize (e.g., approximately maximize) a radiation efficiency of antenna. The one or more antenna cutouts and/or notches can be configured to optimize (e.g., approximately maximize) the impedance bandwidth of antenna, such as by providing a specified impedance bandwidth.

Figure 7A:
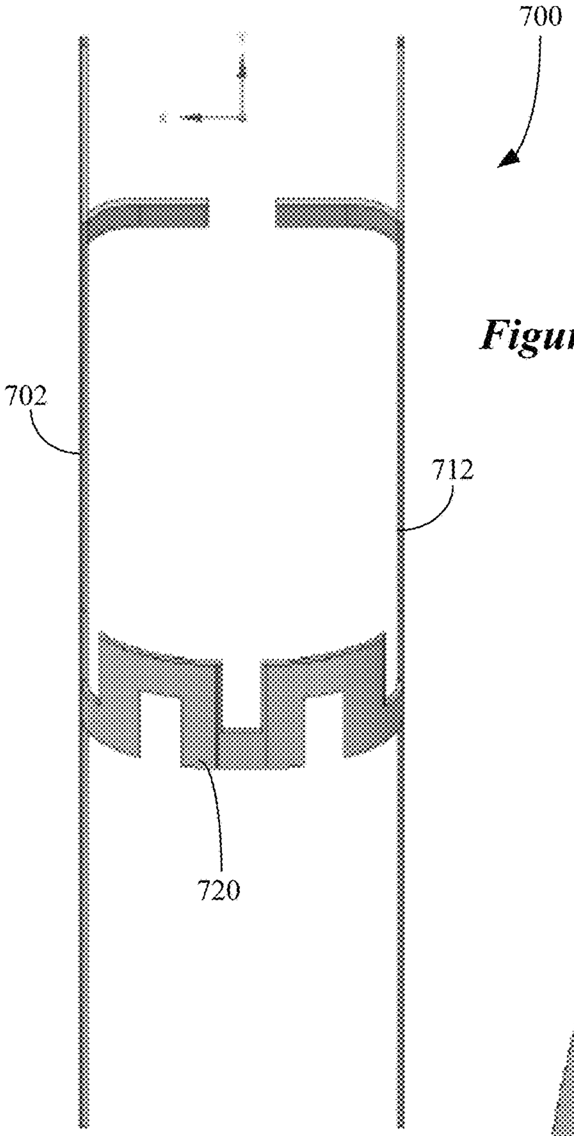
FIGS. 7A and 7B illustrate an antenna comprising a reactively loaded network circuit in accordance with various embodiments.
Figure 7B:
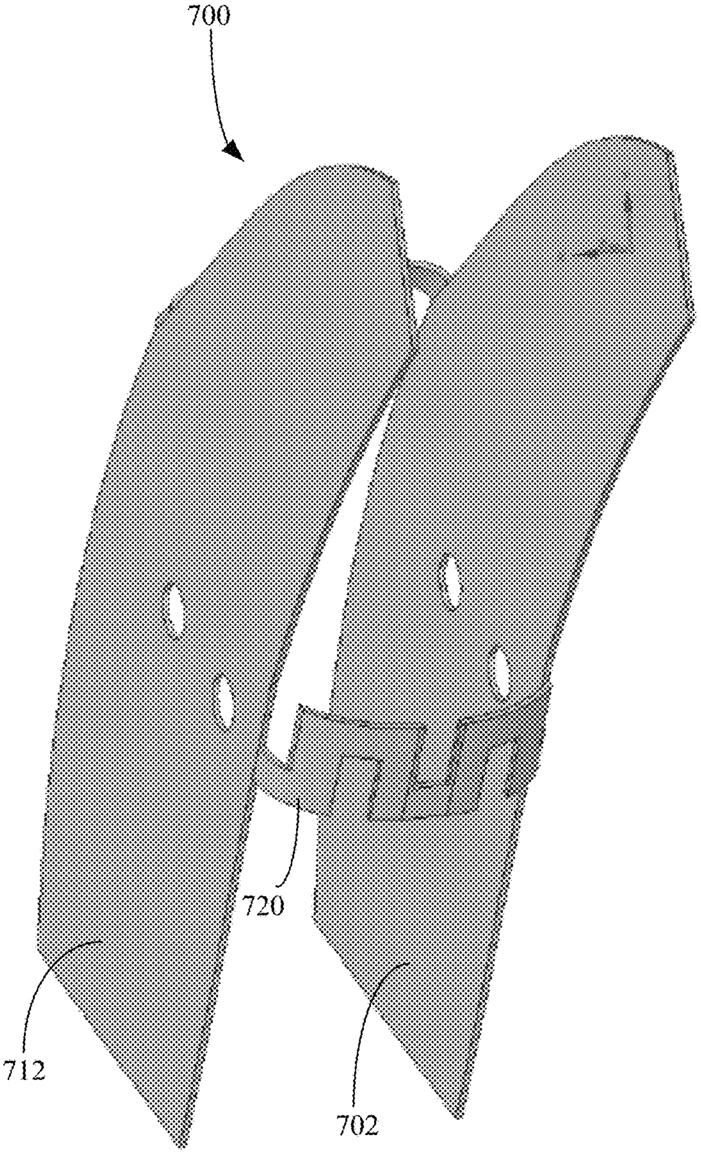

FIGS. 7A and 7B illustrate an antenna comprising a reactively loaded network circuit in accordance with other embodiments. The antenna 700 includes a first antenna element 702, a second antenna element 712, and a strap 720 connecting the first and second antenna elements 702 and 712. In the embodiment shown in FIGS. 7A and 7B, the strap 720 mechanically incorporates a reactive component 720. More particularly, a region of the strap 720 is shaped to function as an inductor. As shown, the strap 720 includes a region having a meandering (e.g., serpentine) shape which functions as an inductor. The mechanical attributes of the shaped region of the strap 720 (e.g., shape, size, thickness) can be modified to achieve a desired value of inductance.

Figure 8:
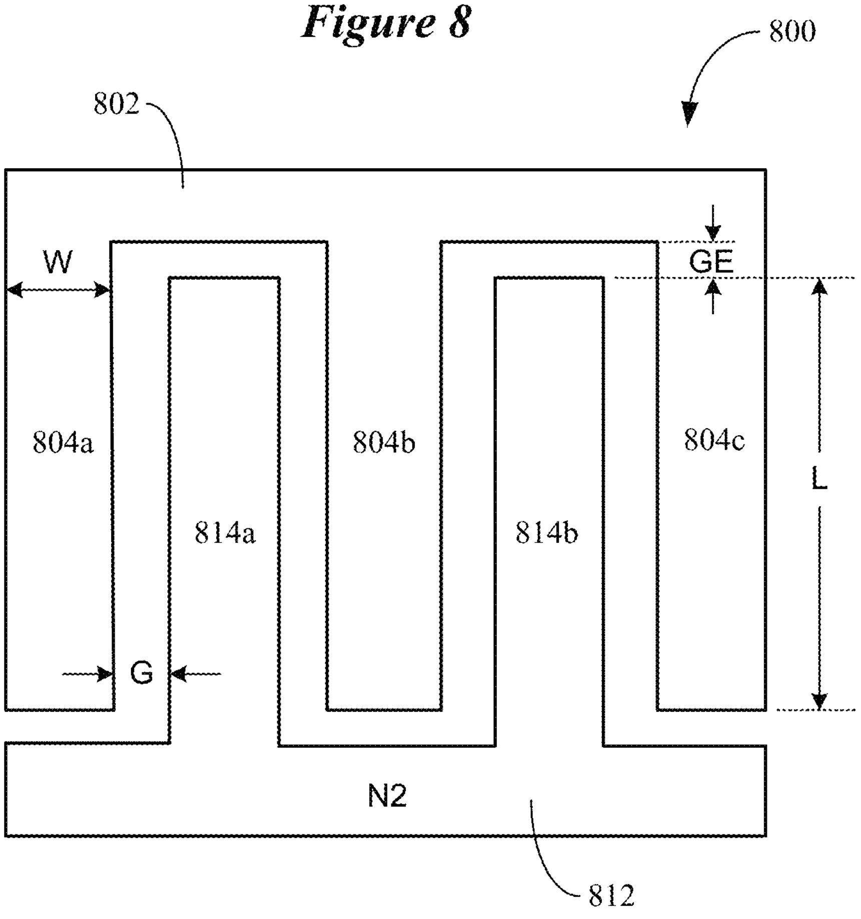
FIG. 8 illustrates an interdigitated capacitor that can serve as a reactive component of a reactively loaded network circuit in accordance with various embodiments.

According to some embodiments, a reactively loaded network circuit of the type discussed herein can incorporate an interdigitated capacitor, rather than a surface mount capacitor. FIG. 8 illustrates an interdigitated capacitor 800 that can be incorporated into the antenna structure (e.g., on the strap between first and second antenna elements) configured for use in an ear-worn electronic device in accordance with various embodiments. The interdigitated capacitor 800 includes a first electrode 802 from which three fingers 804*a*, 804*b*, and 804*c* extend. The interdigitated capacitor 800 also includes a second electrode 812 from which two fingers 814*a* and 814*b* extend. In this illustrative example, the interdigitated capacitor 800 has a total of five fingers 804/814. As is shown in FIG. 8, the fingers 804/814 of the first and second electrodes 802 and 812 are interleaved with one another. A gap, G, is formed between individual fingers 804/814. A space, GE, is defined at the end of each finger 804/814. Each of the fingers 804/814 has a width, W, and a length, L. It is noted that, when implemented on the antenna structure, the interdigitated capacitor 800 shown in FIG. 8 would include a substrate and a ground plane.

The parameters L, W, G, GE, and N (number of fingers) can be selected to achieve a desired capacitance. As was discussed previously with respect to Tables 5 and 6, optimized antenna performance was achieved by incorporating a 1.2 pF capacitor between the first and second antenna elements of a bowtie antenna under evaluation. For the interdigitated capacitor 800 shown in FIG. 8, a 1.2 pF capacitor value can be achieved using the following parameter values: L=3.5 mm, W=5 mm, G=1 mm, GE=0.8 mm, and N=4.

Figure 9:
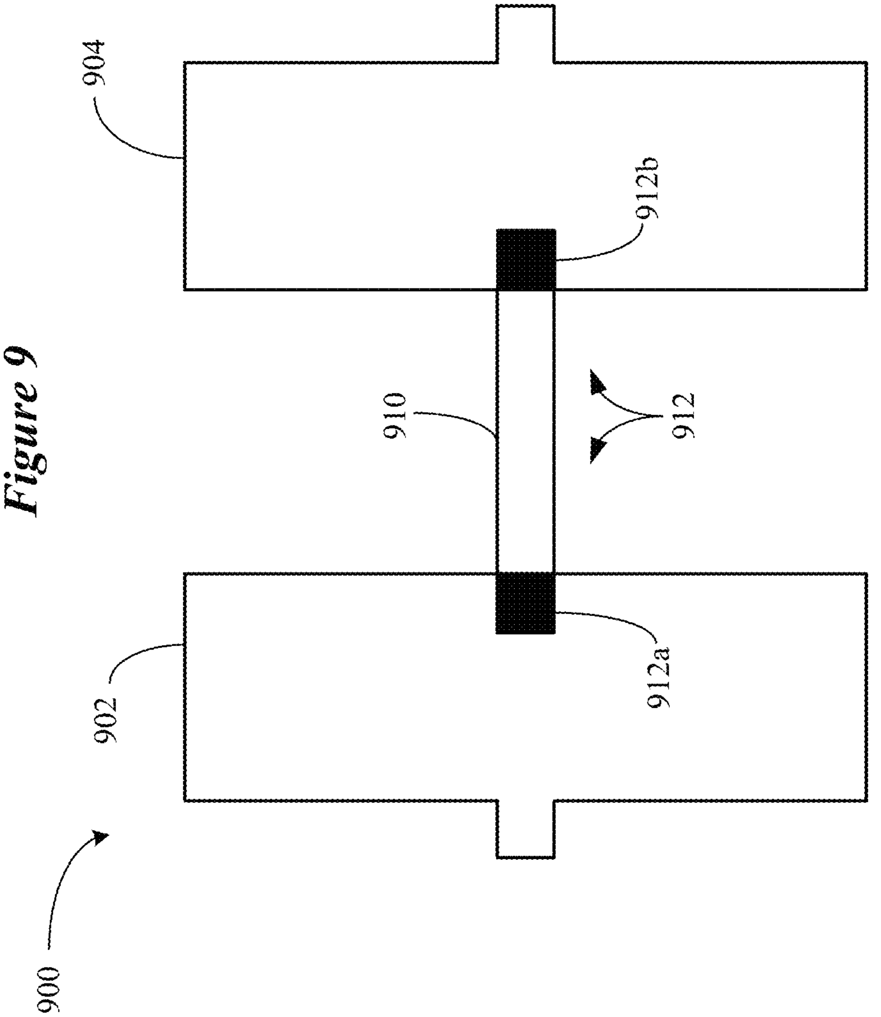
FIG. 9 shows a reactively loaded network circuit implemented on an antenna structure of an ear-worn electronic device in accordance with various embodiments.

FIG. 9 shows a reactively loaded network circuit implemented on an antenna structure of an ear-worn electronic device in accordance with various embodiments. The antenna 900 shown in FIG. 9 includes a first antenna element 902, a second antenna element 904, and a strap 910 connecting the first and second antenna elements 902 and 904. The antenna 900 further includes a distributed reactive component 912 comprising a first reactive component 912*a* and a second reactive component 912*b*. The first reactive component 912*a* is mounted on or connected to the first antenna element 902. The second reactive component 912*b* is mounted on or connected to the second antenna element 904. As shown, the first reactive component 912*a* is positioned on the first antenna element 902 at or adjacent a first end of the strap 910. The second reactive component 912*b* is positioned on the second antenna element 904 at or adjacent a second end of the strap 910. The first and second reactive components 912*a* and 912*b* can be capacitors, inductors, or the combination of capacitors and inductors.

Figure 10:
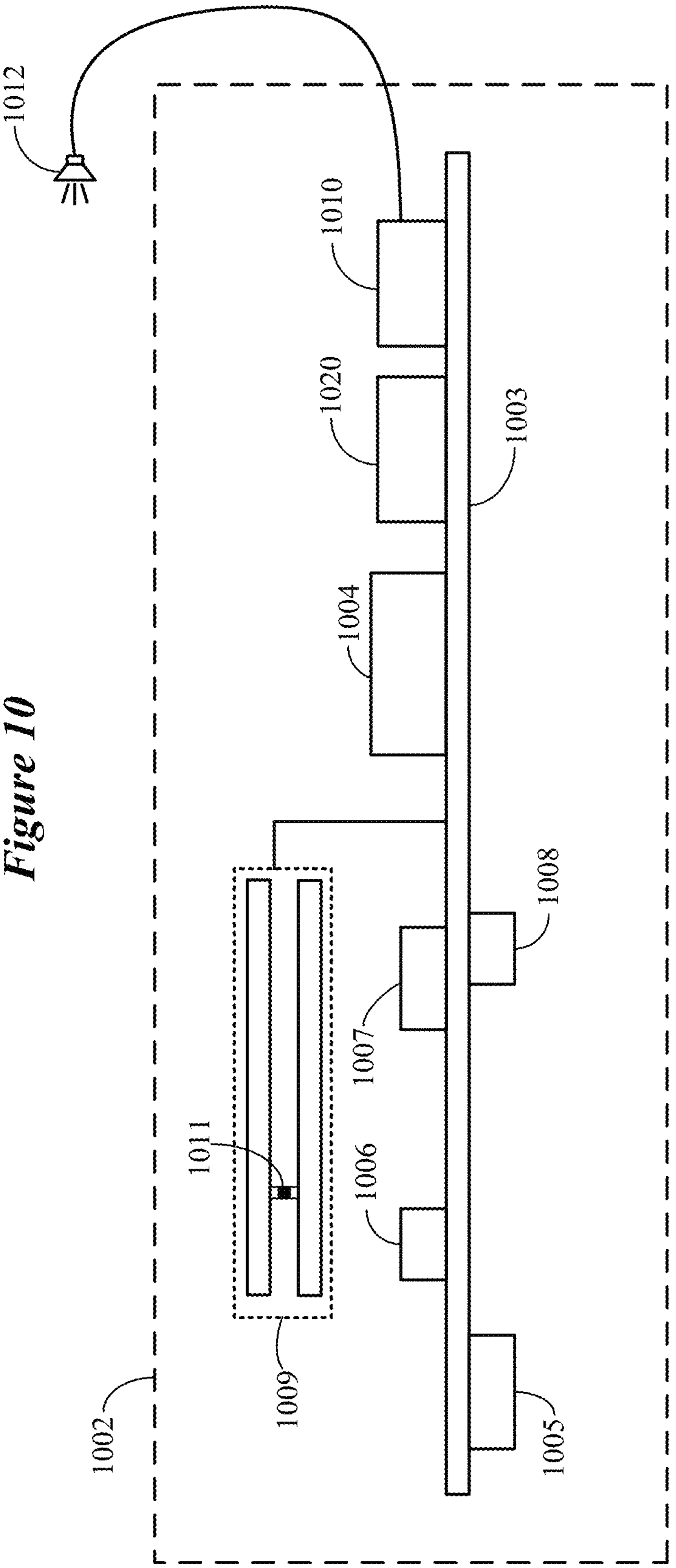
FIG. 10 is a block diagram showing various components of an ear-worn electronic device that can incorporate an antenna comprising a distributed reactively loaded network circuit on the antenna in accordance with various embodiments.

FIG. 10 is a block diagram showing various components of an ear-worn electronic device that can incorporate an antenna comprising a reactively loaded network circuit on the antenna in accordance with various embodiments. The block diagram of FIG. 10 represents a generic ear-worn electronic device 1002 for purposes of illustration. It is understood that the ear-worn electronic device 1002 may exclude some of the components shown in FIG. 10 and/or include additional components. It is also understood that the ear-worn electronic device 1002 illustrated in FIG. 10 can be either a right ear-worn device or a left-ear worn device. The components of the right and left ear-worn devices can be the same or different.

The ear-worn electronic device 1002 shown in FIG. 10 includes several components electrically connected to a mother flexible circuit 1003. A battery 1005 is electrically connected to the mother flexible circuit 1003 and provides power to the various components of the ear-worn electronic device 1002. One or more microphones 1006 are electrically connected to the mother flexible circuit 1003, which provides electrical communication between the microphones 1006 and a digital signal processor (DSP) 1004. Among other components, the DSP 1004 can incorporate or is coupled to audio signal processing circuitry. In some embodiments, a sensor arrangement 1020 (e.g., a physiologic or motion sensor) is coupled to the DSP 1004 via the mother flexible circuit 1003. One or more user switches 1008 (e.g., on/off, volume, mic directional settings) are electrically coupled to the DSP 1004 via the flexible mother circuit 1003.

An audio output device 1010 is electrically connected to the DSP 1004 via the flexible mother circuit 1003. In some embodiments, the audio output device 1010 comprises a speaker (coupled to an amplifier). In other embodiments, the audio output device 1010 comprises an amplifier coupled to an external receiver 1012 adapted for positioning within an ear of a wearer. The ear-worn electronic device 1002 may incorporate a communication device 1007 coupled to the flexible mother circuit 1003 and to an antenna 1009 directly or indirectly via the flexible mother circuit 1003. The antenna 1009 can be a bowtie antenna which includes a reactive component 1011 coupled to first and second antenna elements of the antenna 1009. The communication device 1007 can be a Bluetooth® transceiver, such as a BLE (Bluetooth® low energy) transceiver or other transceiver (e.g., an IEEE 802.11 compliant device). The communication device 1007 can be configured to communicate with one or more external devices, such as those discussed previously, in accordance with various embodiments.

This document discloses numerous embodiments, including but not limited to the following:

Item 1 is an ear-worn electronic device configured to be worn by a wearer, comprising:

- an enclosure configured to be supported by or in an ear of the wearer;
- electronic circuitry disposed in the enclosure and comprising a wireless transceiver; and
- an antenna in or on the enclosure and coupled to the wireless transceiver, the antenna comprising:
  - a first antenna element;
  - a second antenna element; and
  - a reactive component coupled between the first and second antenna elements.

Item 2 is the device of Item 1, wherein the reactive component comprises a capacitor.

Item 3 is the device of Item 2, wherein the capacitor comprises an interdigitated capacitor.

Item 4 is the device of Item 1, wherein the reactive component comprises an inductor.

Item 5 is the device of Item 1, wherein the reactive component comprises an L-C network or an RLC network.

Item 6 is the device of Item 1, wherein the antenna comprises a strap between the first and second antenna elements.

Item 7 is the device of Item 6, wherein the reactive component comprises a surface mounted component disposed on the strap.

Item 8 is the device of Item 6, wherein the reactive component comprises a distributed component mounted to the strap.

Item 9 is the device of Item 6, wherein the strap comprises a shaped region that functions as the reactive component.

Item 10 is the device of Item 1, wherein the reactive component comprises a first reactive component connected to the first antenna element and a second reactive component connected to the second antenna element.

Item 11 is the device of Item 1, comprising a matching network disposed between the wireless transceiver and feed conductors of the antenna, wherein the matching network is configured to substantially cancel a reactance of the antenna at the feed conductors that is modified by a reactance of the reactive component.

Item 12 is the device of Item 1, wherein:

- the antenna comprises the first antenna element, the second antenna element, and one or more additional antenna elements; and
- one or more of the reactive components are coupled between the first, second, and the one or more additional antenna elements.

Item 13 is the device of Item 1, wherein the antenna is configured as a bowtie antenna.

Item 14 is an ear-worn electronic device configured to be worn by a wearer, comprising:

- an enclosure configured to be supported by or in an ear of the wearer;
- electronic circuitry disposed in the enclosure and comprising a wireless transceiver; and an antenna in or on the enclosure and comprising:

a first antenna element having a first side and an opposing second side, the first side connected to a first feed line conductor;

a second antenna element having a first side and an opposing second side, the first side of the second antenna element connected to a second feed line conductor, the first and second feed line conductors coupled to the wireless transceiver;

a strap connected to the second side of the first antenna element and the second side of the second antenna element; and the strap comprising a reactive component.

Item 15 is the device of Item 14, wherein the reactive component comprises a capacitor.

Item 16 is the device of Item 15, wherein the capacitor comprises an interdigitated capacitor.

Item 17 is the device of Item 14, wherein the reactive component comprises an inductor.

Item 18 is the device of Item 14, wherein the reactive component comprises an L-C network or an RLC network.

Item 19 is the device of Item 14, wherein the reactive component comprises a surface mounted component disposed on the strap.

Item 20 is the device of Item 14, wherein the reactive component comprises a distributed component mounted to the strap.

Item 21 is the device of Item 14, wherein the strap comprises a shaped region that functions as the reactive component.

Item 22 is the device of Item 14, wherein the strap comprises a first reactive component connected to the first antenna element and a second reactive component connected to the second antenna element.

Item 23 is the device of Item 14, comprising a matching network disposed between the wireless transceiver and the first and second feed line conductors of the antenna, wherein the matching network is configured to substantially cancel a reactance of the antenna at the first and second feed line conductors that is modified by a reactance of the reactive component.

Although the subject matter has been described in language specific to structural features and/or methodological acts, it is to be understood that the subject matter defined in the appended claims is not necessarily limited to the specific features or acts described above. Rather, the specific features and acts described above are disclosed as representative forms of implementing the claims.

What is claimed is:

1. An ear-worn electronic device configured to be worn by a wearer, the device comprising:

an enclosure configured to be supported by or in an ear of the wearer;

electronic circuitry disposed in the enclosure and comprising a wireless transceiver; and an antenna in or on the enclosure and comprising:

a feed comprising first and second feed line conductors coupled to the wireless transceiver;

a first antenna element having a first side and a second side, the first and second sides of the first antenna element being on opposite edges of the first antenna element, the first side of the first antenna element being connected to the first feed line conductor;

a second antenna element having a first side and a second side, the first and second sides of the second antenna element being on opposite edges of the second antenna element, the first side of the second antenna element being connected to the second feed line conductor; and a strap connected to the second side of the first antenna element and the second side of the second antenna element, wherein a shaped portion of the strap is meandered so that the shaped portion of the strap functions as a reactive component that modifies a surface current of the antenna to modify an input impedance at the feed, and the strap is situated at a location other than at or between the first and second feed line conductors.

2. The device of claim 1, wherein the antenna is a balanced antenna.

3. The device of claim 1, wherein the antenna is configured as a bowtie antenna.

4. The device of claim 1, wherein the reactive component is configured to modify the surface current of the antenna to modify the input impedance at the feed to increase antenna efficiency.

5. The device of claim 1, wherein the device is a hearing aid.

6. The device of claim 1, further comprising a matching network disposed between the wireless transceiver and the first and second feed line conductors of the antenna, wherein the matching network is configured to substantially cancel a reactance of the antenna at the first and second feed line conductors that is modified by a reactance of the reactive component.

* * * * *